Sept. 27, 1960     C. B. JARDINE     2,954,109
CENTRIFUGAL CLUTCHES
Filed Sept. 24, 1957
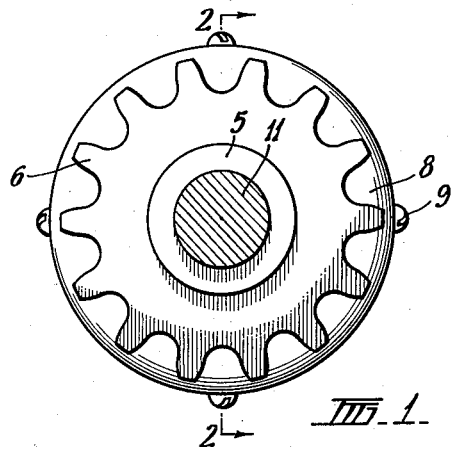
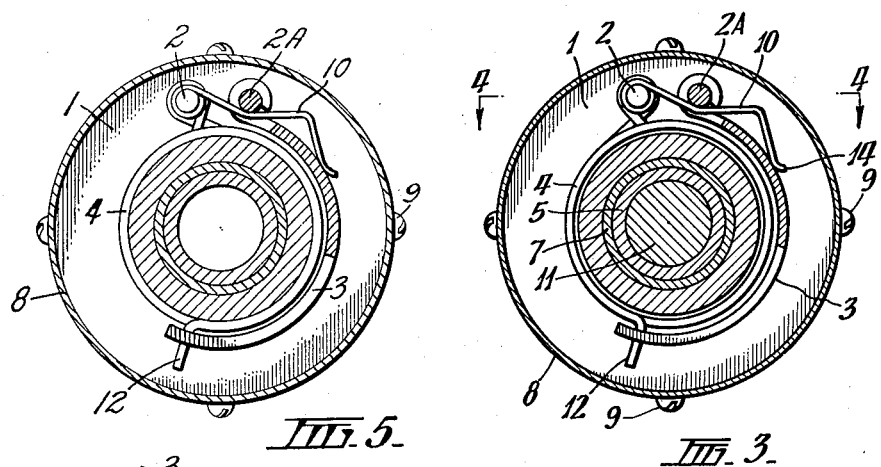
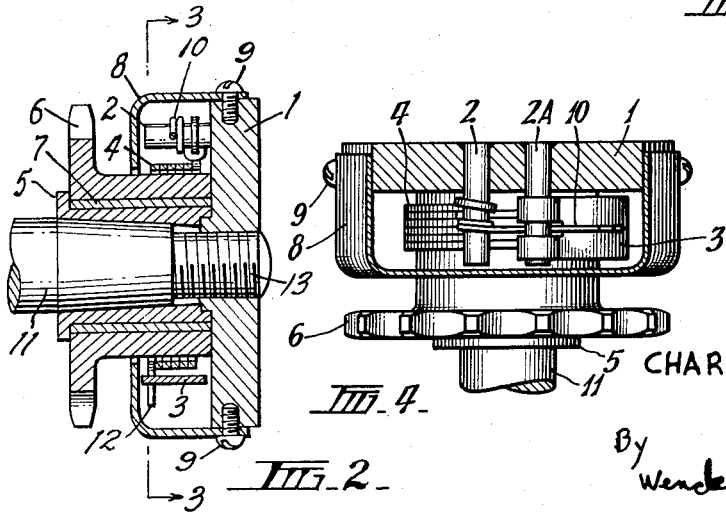
CHARLES B. JARDINE
INVENTOR
By Wenderoth, Lind & Ponack
Attys United States Patent Office 2,954,109
Patented Sept. 27, 1960

2,954,109
CENTRIFUGAL CLUTCHES
Charles Burgess Jardine, 10 Tower Road, North Balwyn, Victoria, Australia
Filed Sept. 24, 1957, Ser. No. 685,879
Claims priority, application Australia Sept. 25, 1956
3 Claims. (Cl. 192—105)

This invention relates to clutch couplings and pulley clutches and the like of the helical coil spring type in which means are provided to control the engagement and disengagement of the clutch automatically.

The presently used helical coil spring type of clutch consists essentially of a helical coil spring mounted upon and surrounding the drum of the driven member. One end of the coil spring is attached to the driving member, the coil spring being wound in such manner that rotation of the driving member tends to wrap the coil spring around the driven drum. The coil spring usually is of slightly larger inside diameter than the diameter of the drum. By means of manually operated cam and/or lever or by magnetic means, torsional force is applied to the trailing end of the coil spring to wrap the coils of the spring around the drum to transmit power from the driving member to the driven member.

The basic characteristic properties of a helical coil spring, when used for transmitting power, are well known. If a helical coil spring is mounted concentrically upon a drum to be driven, the inside diameter of the coil spring being approximately the same as that of the drum or a "push" fits upon the drum, one end of the coil spring being attached to a driving member, the coil spring being so wound that the driving member tends to tighten the coils of the spring around the drum, then, if there is a sufficient number of coils in the coil spring, the coil spring will, when driven, transmit power from the driving member to the driven drum up to the breaking strain of the spring material. The sole requirement is that the coil spring and the driven drum be in light frictional contact such as is obtained when the coil spring is a "push" fit on the drum. No external force either torsional or radial, is required to be applied to the free end of the coil spring to increase the force of such light frictional contact, for the effective transmission of power.

The ability of the coil spring to transmit a large force is due to the difference between the tensions at the ends of the coil spring, the ratio increasing enormously with each additional coil of the coil spring.

In order to use the helical coil spring described above as a clutch element, it would be necessary to provide means for applying a torsional force to the free end of the coil spring to open the coils, thus increasing the diameter of the coil spring to disengage the coil spring from the driven member.

Alternatively, if the inside diameter of the coil spring were slightly larger than that of the driven drum, it would be necessary, for the transmission of power, to apply a small torsional force to the free end of the coil spring to reduce the diameter of the coil spring sufficiently to bring the said coil spring into frictional contact with the drum, such frictional contact corresponding to that obtained when the coil spring is a "push" fit on the drum, as previously described.

The present invention makes specific use of and depends upon the characteristic properties of a helical coil spring for transmitting power and provides, to work in combination therewith, a centrifugal governing device functioning as a governor for the sole purpose of applying the small torsional force required for deflecting the end of the helical coil spring, to reduce or increase the diameter of the coil spring sufficiently to bring the said coil spring into or out of frictional contact with the driven drum, such frictional contact being comparable to that obtained when the coil spring is a "push" fit on the driven drum.

The force of the centrifugal governing device is limited to that necessary for regulating the diameter of the helical coil spring as aforesaid, and is not related to the power transmitted, which latter is adequately effected by the coil spring itself, once the said coil spring is brought into frictional contact with the drum.

In other types of centrifugal clutches, the power transmitted depends upon the force applied by the centrifugal member.

Thus according to the present invention there is provided a centrifugal clutch comprising a driving member, a member to be driven, a helical coil spring driven by said driving member for transmitting power from the driving member to the driven member, a centrifugal governing device on said driving member operating the said helical coil spring for the sole purpose of regulating the diameter of the helical coil spring, the said helical coil spring having a sufficient number of coils for transmitting power up to the breaking strength of the helical coil spring material.

The helical coil spring clutch is well known and is commonly called the "coil clutch." It is to this type of clutch that the present invention relates.

It has now been discovered that a centrifugal governing device may be used to operate automatically a helical coil spring clutch element.

The present invention makes specific use of the characteristic of a helical coil spring clutch element that for its operation it is necessary only to bring the coils of the helical coil spring into or out of close frictional contact with the driven member, the centrifugal governing device functioning as a governor with the sole duty of providing the small torsional force for deflecting the end of the coil spring for frictionally engaging or disengaging the coil spring and the driven member, the coils of the helical coil spring functioning to augment enormously the slight friction between the coil spring and the driven member to permit a large force to be transmitted by the said coil spring from the driving member to the driven member.

The centrifugal force of the governing device is related only to the torsional force required to deflect the end of the coil spring to the extent necessary and the force capable of being transmitted by the coil spring is related to the number of coils of the spring and the tensile strength of the spring material used. The centrifugal force of the governing device and the power transmitted are not related or proportionate one to the other.

Thus according to the present invention there is provided a centrifugal clutch comprising a driving member, a member to be driven, a helical coil spring driven by said driving member for transmitting power from the driving member to the driven member, a centrifugal governing device operating the said helical coil spring for the sole purpose of governing the frictional engagement of the said helical coil spring and the driven member, the said helical coil spring having a sufficient number of coils for transmitting power up to the tensile strength of the spring coil material.

In the mechanism of the invention there may be provided means for constraining the centrifugal governing device in applying torsion to the said helical spring. Such means may consist of formed spring wire or leaf springs which may be varied or adjusted so as to regulate the extent to which the centrifugal governing device is constrained in the manner indicated or alternatively the centrifugal governing device may be directly connected to one end of the helical coil spring without using any other constraining means for the centrifugal device.

The clutch mechanism as herein described can be used both as a clutch coupling and pulley clutch.

It fulfills the function of an automatic clutch by permitting the prime mover to attain sufficient speed and develop adequate torque before taking up the load.

When the clutch is disengaged the helical coil spring is not in frictional contact with the drums of the driving and/or driven members and consequently is not subjected to wear during disengagement. The action of the centrifugal device in wrapping the helical coil spring forcibly around the member to be driven compensates for wear and greatly increases the life of the clutch coil spring.

The clutch mechanism of the invention can be assembled in such manner that the helical coil will slip at a predetermined load or disengage at a predetermined speed. The said mechanism has been so designed that the helical coil clutch may be fully enclosed in an oil tight casing; alternatively the construction may be open with self-oiling bearings. In relation to its power the mechanism is very small and light in weight and its manufactured cost is low, moreover its torque is high at low speeds.

In order now to more clearly indicate the features of the invention above outlined, reference will be made to the accompanying drawings which illustrate a preferred method of construction.

Referring now to the drawings:

Figure 1 illustrates in elevation from the rear and in partial section a clutch mechanism according to the invention.

Figure 2 illustrates in vertical section along the line 2—2 of Figure 1 of said mechanism.

Figure 3 is a section along the line 3—3 of Figure 2, and,

Figure 4 is a section along the line 4—4 of Figure 3.

Fig. 5 is a view similar to Fig. 3 showing a modification of the mechanism whereby it can be used as a speed limiting device.

Like reference numerals illustrated and described herein have a like significance.

The engine shaft, 11, is of the tapered variety and threaded as shown, 13, at the end for a nut and used largely for small internal combustion engines.

A flanged sleeve 5 with a suitable tapered bore is fitted to the engine shaft 11. Upon this sleeve and free to rotate upon it, is mounted a chain sprocket 6 which has a sintered bronze or other anti-friction bushing 7. A threaded driving disc 1 is screwed on to the engine shaft forcing the sleeve 5 on to the tapered engine shaft 11 and retaining it securely. The boss of the chain sprocket 6 is hardened and projects outwardly closely abutting the driving disc 1, the said chain sprocket having running clearance only between the driving disc and the small flange of sleeve 5. The helical coil of spring wire 4 preferably of rectangular section material, is mounted upon the boss of the chain sprocket 6, the inside diameter of the coil being slightly (say .020") larger than the diameter of the boss. On the inner side of the driving disc 1 is fixed a pin 2A upon which is pivoted a semi-circular arm or lever 3, hereinafter called the governor arm, which curves around the outer face of the helical clutch coil 4 mounted on the boss of the chain sprocket 6. One end of the helical coil 4 is attached to a pin 2 fixed to the driving disc adjacent to and on the same radius as the pivot pin 2A of the curved governor arm 3 above-mentioned, the other end of the helical coil 4 being attached to the end of the governor arm, the outwardly turned end of the coil passing through a hole near the free end of the governor arm as indicated at 12.

The clutch coil is wound either right or left hand according to the direction of rotation, being so arranged that the rotation of the driving disc 1 tends to tighten the coils of the clutch coil around the chain sprocket boss 6. The drawing illustrates a right hand coil with clockwise rotation. For anti-clockwise rotation the clutch assembly is reversed, that is to say, a left hand wound coil is mounted on pin 2A and the governor arm 3 pivoted on pin 2.

It will be clear that the governor arm 3 and the clutch coil 4 are so arranged that the outward movement of the governor arm 3 will wrap the coils of the clutch coil 4 tightly around the boss of the chain sprocket 6. The weight of the governor arm is so adjusted that it moves outwardly by centrifugal force at a pre-determined speed of the prime mover. Although it is quite practicable to fit a governor arm of a suitable weight to provide any required starting speed for a particular application, it has been found that for general use it is preferable to provide a governor arm which will move outwardly at a comparatively slow speed of the prime mover and to vary such starting speed by means of a governor spring 10. This governor spring is a formed steel wire spring with two or more coils on one end, anchored by passing the said coils over pin 2. The spring passes from the upper side of pin 2 through a slot in the end of the governor arm 3 and beneath the pivot pin 2A, which is its fulcrum, and the spring is so formed that its curved end rests lightly against the governor arm 3 as indicated at 14 when the governor arm is in its innermost position. The governor arm 3 therefore cannot be moved outwardly without deflecting the governor spring 10, requiring a higher speed of the prime mover to provide the necessary centrifugal force.

It will be clear therefore, that the starting speed, that is to say, the speed at which the clutch takes up the load, can be varied very widely according to the strength of the governor spring 10, which depends upon the diameter of the wire used for the spring and also its length.

The clutch is enclosed by a light metal casing 8 affixed to the driving disc 1. A suitable seal may be fitted between the casing and the boss of the sprocket 6 to provide an oil tight chamber for the clutch, if so desired.

In operation, when the engine is started the chain sprocket 6 remains stationary being loosely mounted on the sleeve 5. When the engine throttle is opened and the engine reaches a pre-determined speed the governor arm 3 moves outwardly wrapping the clutch coil 4 gradually around the boss of the chain sprocket 6 which then rotates, taking up the drive. Closing the throttle disengages the clutch as the governor arm 3 moves to its innermost position at the pre-determined engine speed.

When the engine or other prime mover has a parallel shaft with keyway, the clutch is arranged with a parallel sleeve set screwed to the shaft and functioning similarly to the tapered sleeve 5 and the driving disc is keyed to the shaft being otherwise exactly similar to the driving disc 1.

For very small clutches the parallel sleeve above mentioned may be of sintered bronze or other self oiling material upon which a chain sprocket similar to sprocket 6 may be directly mounted.

When the diameter of the chain sprocket or pulley as the case may be, permits, the driving disc 1 and the parallel shaft sleeve may be made integral and a small retaining collar fitted instead of the small retaining flange on sleeve 5.

For use as a clutch coupling a standard type of flanged shaft coupling is used. One half-body of the coupling, with a hardened boss similar to that of the chain sprocket 6 is substituted for the said sprocket and the clutch is assembled on the engine shaft with the half-body of the coupling projecting outwardly. The other half-body of the shaft coupling keyed to the shaft to be driven is located in proper alignment and the two half-bodies of the coupling bolted together.

In the mechanisms above described the clutch coil spring is of greater inside diameter than the diameter of the driving or driven drums and therefore not in frictional contact with them when the clutch is disengaged.

The clutch coil spring 4 may be of smaller inside diameter than the diameter of the driven drum provided that when the governor arm 3 is in its innermost position, the governor spring 10 is arranged to exert sufficient pressure on the governor arm 3 to open the coils of the clutch coil spring 4 and thus increase its diameter, so that the said clutch coil spring is not in frictional contact with the driven drum and occupies a position relative to the driven drum, identical with a clutch coil spring with an inside diameter slightly larger than the diameter of the driven drum, as illustrated in Figure 3. In operation, as soon as the governor arm 3 moves outwardly the clutch coil spring 4 automatically contracts around the drum, the governor arm increasing the pressure, thus also serving to take up wear of the clutch coil spring.

If for special purposes the clutch is required to slip frequently or for comparatively long periods under overload conditions, the clutch as described above may be combined with any well known type of overload or safety gear mechanism preferably of the radially arranged spring and ball type, whereby the driven drum is connected with the chain sprocket, pulley or coupling as the case may be, by means of the said overload mechanism. When the load rises to a predetermined value the overload mechanism comes into operation obviating slippage between the helical coil spring and the drum.

The clutch may also be arranged as a speed limiting device as illustrated in Figure 5. The clutch coil spring 4 is of slightly smaller inside diameter than the diameter of the driven drum. The clutch coil spring is so wound that the outward movement of the governor arm 3 opens the coils of the said clutch coil spring, thus increasing its diameter. In operation, power is transmitted to the driven drum by the clutch coil spring 4, contracted tightly around the said driven drum while the governor arm 3 is in its innermost position. As the governor arm moves outwardly at the predetermined speed, the coils of the clutch coil spring are opened, increasing the diameter of the said clutch coil spring and thus disengaging the clutch.

Any kind of known centrifugal device such as a weighted flat spring or toggle arms may be used in place of the curved governor arms hereinbefore described for the purpose of providing a centrifugal governing device to operate automatically the helical coil spring as a clutch. Various other modifications and/or additions may be incorporated in the foregoing without departing from the spirit and scope of the invention.

I claim:

1. A centrifugal clutch comprising a driving member having a flanged body and sleeve on which said body is mounted, the driving member adapted to be affixed to a driving shaft, a driven member having a drum formed integrally therewith and rotatably mounted upon the sleeve of the driving member, the end of the said drum closely abutting the face of the flange of the driving member, means on said clutch for retaining said drum in said closely abutting position, a helical coil spring of slightly larger inside diameter than the diameter of said drum, said spring being mounted concentric with and external of said drum, a pin mounted on the inner face of said flanged body to which one end of said helical coil spring is affixed, a governor arm having a substantially semicircular form, a further pin affixed to the said flanged body on the same radius and adjacent to said pin to which the helical coil spring is attached, said governor arm having one end pivotally mounted on said further pin and curving around the outer face of said helical coil spring and being attached to the other end of the said helical coil spring near the end of said governor arm, a formed wire spring mounted on said pin to which the helical coil spring is attached, said governor arm having a slot therein, said wire spring passing beneath said further pin and through the said slot in said governor arm, said further pin being the fulcrum for said wire spring, the end of said wire spring being curved and resting lightly against the outer side of the governor arm when the said governor arm is in its innermost position, whereby the outward movement of the governor arm is constrained by the said formed wire spring in accordance with the strength of the said spring and whereby outward movement of the governor arm under the effect of centrifugal force will apply a torsional force to the helical coil spring for reducing the diameter of the helical coil spring to effect frictional contact of the said helical coil spring and the driven drum enabling transmission of power by the said helical coil spring from the driving member to the driven member.

2. A centrifugal clutch comprising a driving member having a flanged body and sleeve on which said body is mounted, the driving member adapted to be affixed to a driving shaft, a driven member having a drum formed integrally therewith and rotatably mounted upon the sleeve of the driving member, the end of the said drum closely abutting the face of the flange of the driving member, means on said clutch for retaining said drum in said closely abutting position, a helical coil spring of slightly smaller inside diameter than the diameter of said drum, said spring being mounted concentric with and external of said drum, a pin mounted on the inner face of said flanged body to which one end of said helical coil spring is affixed, a governor arm having a substantially semicircular form, a further pin affixed to the said flanged body on the same radius and adjacent to said pin to which the helical coil spring is attached, said governor arm having one end pivotally mounted on said further pin and curving around the outer face of said helical coil spring and being attached to the other end of the said helical coil spring near the end of said governor arm, a formed wire spring mounted on said pin to which the helical coil spring is attached, said governor arm having a slot therein, said wire spring passing beneath said further pin and through the said slot in said governor arm, said further pin being the fulcrum for said wire spring, the end of said wire spring being curved and pressing on the outer side of the governor arm and when the said governor arm is in its innermost position and exerting sufficient torsional force on the helical coil spring to increase the diameter of the said spring and disengage it from the drum of the driven member, whereby outward movement of the governor arm will relax such pressure permitting the coils of the helical coil spring to contract tightly around the drum of the driven member to transmit power to the said driven member.

3. A centrifugal clutch comprising a driving member having a flanged body and sleeve on which said body is mounted, the driving member adapted to be affixed to a driving shaft, a driven member having a drum formed integrally therewith and rotatably mounted upon the sleeve of the driving member, the end of the said drum closely abutting the face of the flange of the driving member, means on said clutch for retaining said drum in said closely abutting position, a helical coil spring of slightly smaller inside diameter than the diameter of said drum, said spring being mounted concentric with and external of said drum, a pin mounted on the inner face of said flanged body to which one end of said helical coil spring is affixed, a governor arm having a substantially semicircular form, a further pin affixed to the said flanged body on the same radius and adjacent to said pin to which the helical coil spring is attached, said governor arm having one end pivotally mounted on said further pin and being attached to the other end of the said helical coil spring near the end of said governor arm, the coils of the said helical coil spring being tightly contracted about the drum of the driven member for transmitting power to said driven member when the governor arm is in its innermost position, a formed wire spring mounted on said pin to which the helical coil spring is attached, said governor arm having a slot therein, said wire spring passing beneath said further pin and through the said slot in said governor arm, said further pin being the fulcrum for said wire spring, the end of said wire spring being curved and resting lightly against the outer side of the governor arm when the said governor arm is in its innermost position, whereby the outward movement of the governor arm constrained by the formed wire spring in accordance with the strength of the said formed wire spring will apply a torsional force to the helical coil spring to increase the diameter of the said helical coil spring to disengage it from the drum of the driven member and cause the cessation of transmission of power thereto.

References Cited in the file of this patent

UNITED STATES PATENTS

| | | |
|---|---|---|
| 1,481,593 | Fieux | Jan. 22, 1924 |
| 2,020,040 | Rauen | Nov. 5, 1935 |
| 2,546,633 | Dodge | Mar. 27, 1951 |
| 2,670,829 | Bruestle | Mar. 2, 1954 |
| 2,789,674 | Zahradnick et al. | Apr. 23, 1957 |